United States Patent [19]

Loucks

[11] 4,345,051

[45] Aug. 17, 1982

[54] BLOCK COPOLYMERS OF POLYPHENYLENE OXIDES AND POLYFORMALS OF STERICALLY-HINDERED DIHYDRIC PHENOLS

[75] Inventor: George R. Loucks, Scotia, N.Y.

[73] Assignee: General Electric Company, Schenectady, N.Y.

[21] Appl. No.: 239,723

[22] Filed: Mar. 2, 1981

[51] Int. Cl.$^3$ .................. C08G 81/00; C08G 65/40
[52] U.S. Cl. ............................. 525/390; 525/534; 528/219
[58] Field of Search .............. 525/390, 534; 528/219

[56] References Cited

U.S. PATENT DOCUMENTS 3,069,386  12/1962  Barclay .............................. 528/219

FOREIGN PATENT DOCUMENTS 937696  11/1973  Canada ............................. 525/390
2738962  11/1978  Fed. Rep. of Germany ...... 528/219

Primary Examiner—Wilbert J. Briggs, Sr.
Attorney, Agent, or Firm—Peter A. Bielinski; James C. Davis, Jr.; Marvin Snyder

[57] ABSTRACT

This invention relates to block copolymers of polyphenylene oxides and polyformals of sterically-hindered dihydric phenols. These block copolymers can be molded, calendered, or extruded as films, sheets, fibers, laminates or other useful articles of manufacture.

5 Claims, No Drawings

BLOCK COPOLYMERS OF POLYPHENYLENE OXIDES AND POLYFORMALS OF STERICALLY-HINDERED DIHYDRIC PHENOLS

BACKGROUND OF THE INVENTION

1. Field of the Invention

This invention relates to block copolymers of polyphenylene oxides and sterically hindered dihydric phenols. These formal-coupled block polymers can be molded, calendered, or extruded as films, sheets, fibers, laminates or other useful articles of manufacture.

2. Description of the Prior Art

Polyphenylene oxides having an average hydroxyl group per molecule of 1.0 or less, are described in A. S. Hay's U.S. Pat. Nos. 3,306,879; 3,914,266; and 4,028,341; among others.

Polyphenylene oxides having an average hydroxyl group per molecule greater than zero including 2.0 or less are described in D. M. White's U.S. Pat. Nos. 4,140,675 and 4,234,706 among others.

Polyformals are described in R. Barclay, Jr."s U.S. Pat. No. 3,069,386, A. S. Hay's copending U.S. Ser. No. 858,040, filed Nov. 6, 1978, and G. R. Loucks et al. Ser. No. 889,397, filed Mar. 23, 1978.

DESCRIPTION OF THE INVENTION

This invention embodies block copolymers of polyphenylene oxides and polyformals of sterically-hindered dihydric phenols.

In general, illustrative of the broad group of block polymers of polyphenylene oxides and polyformals of sterically-hindered dihydric phenols (hereinafter also referred to as "SH-dihydric phenols") included within the scope of this invention are those described, among others, by the following model structures:

AZ(CZ)$_x$, BZ(CX)$_x$, AZ(CZ)$_x$A, AZ(CX)$_x$B, BZ(CZ)$_x$B, (I) AZ(CZ)$_x$BZ(CZ)$_x$A, AZ(CZ)$_x$BZ(CZ)$_x$(CZ)$_x$B, AZBZ(CZ)$_x$BZ(CZ)$_x$BZA, etc., etc., etc.

wherein x is a number of from 1 to 200 or higher, often preferably from 30 to 100, and frequently from 40 to 70.

The above illustrative linear combinations of mono- and polyfunctional polyphenylene oxides, and sterically-hindered aromatic polyformals including random and/or alternating arrangements of the polymer segments defined by the units A, B, (CZ)$_x$, and coupling agent Z, which units and coupling agents are described in greater detail hereafter are not intended to limit the combinations that can be obtained by the practice of this invention.

The expression polyphenylene oxides includes "mono-functional polyphenylene oxides" well known to those skilled in the art having an average hydroxyl group per molecule value greater than zero including 1.0 or less. These polyphenylene oxides can be prepared by any of the methods of the prior art, and may be illustrated by formula (II) set out hereafter:

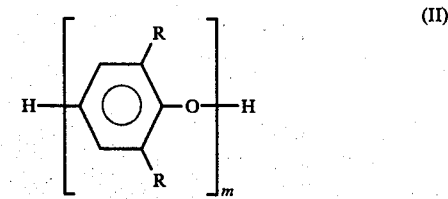

where independently each R is hydrogen, a hydrocarbon radical, a halohydrocarbon radical, a hydrocarbonoxy radical or a halohydrocarbonoxy radical, m is a number of at least 1, preferably 10, and more preferably 40 to 170. The monofunctional polyphenylene oxide units of the block polymers can be conceptualized by the structure of formula (II) above wherein the hydrogen atom is disassociated from the monohydroxy group of the polyphenylene oxide, i.e., a phenoxy radical, which may be referred to as a monovalent phenoxy radical, abbreviated herein by the formula —A.

The expression "polyphenylene oxide" also includes "polyfunctional polyphenylene oxides" also well known to those skilled in the art including quinone-coupled polyphenylene oxides having an average hydroxyl group per molecule greater than zero including 2.0 or less. These polyphenylene oxides can be prepared by the methods described in U.S. Pat. No. 4,234,706 and may be illustrated by formula (III) set out hereafter:

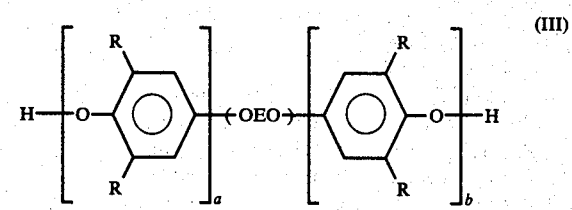

wherein independently —OEO— is a divalent quinone residue, E is a divalent arene radical, either a or b is at least equal to 1, the sum of a plus b is preferably at least equal to 10, more preferably 40 to 170, R is the same as in formula (II) above. The polyfunctional polyphenylene oxide units of the block polymers can be conceptualized by the structure of formula (III) above wherein the hydrogen atoms are disassociated from the hydroxy groups of the quinone-coupled polyphenylene oxide, i.e., a quinone-coupled polyphenoxy radical, which may be referred to as a divalent phenoxy radical, abbreviated herein by the formula —B—.

The expression "SH-dihydric phenols" as employed herein and in the claims includes any bis-phenol having both hydroxy groups sterically-hindered by the presence of halogens, hydrocarbon or hydrocarbonoxy groups ortho-positioned relative to the hydroxy groups of the bisphenol. Sterically-hindered is defined herein as the presence of a halogen, hydrocarbon or hydrocarbonoxy group directly bonded to carbon atoms ortho-positioned (adjacent to) the carbon atoms directly bonded to the hydroxyl groups of the bisphenol. These bisphenols are well known to those skilled in the art and can be illustrated by formula (IV) set out hereafter:

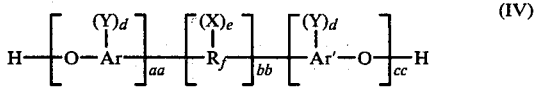

where $R_f$ is an alkylene, alkylidene including "vinylidene", cycloalkylene, cycloalkylidene or arylene linkage or a mixture thereof, a linkage selected from the group consisting of ether, carbonyl, amine, a sulfur or phosphorous containing linkage, Ar and Ar' are arene radicals, Y is bromine, chlorine or a monovalent alkyl or alkoxy group, d represents a whole number of at least 2 up to a maximum equivalent to the number of replaceable hydrogens substituted on the aromatic rings comprising Ar or Ar'—subject to the proviso that at least two Y groups are ortho-positioned relative to each —OH group of each arene radical, x is bromine, chlorine or a monovalent hydrocarbon group selected from the class consisting of alkyl, aryl and cycloalkyl and mixtures thereof, e represents a whole number of from 0 to a maximum controlled by the number of replaceable hydrogens on $R_f$, aa, bb and cc represents whole numbers including 0, when bb is not zero, neither aa nor cc may be zero otherwise either aa or cc but not both may be 0, when bb is zero, the aromatic group can be joined by a direct carbon bond.

Included in the bis-phenols of formula (IV) are, for example, the following:

2,4'-dihydroxy-3,3',5,5'-tetramethyldiphenylmethane;
bis-(4-hydroxy-3,5-dimethylphenyl)methane;
1,1-bis-(4-hydroxy-3,5-diethylphenyl)ethane;
1,1-bis-(4-hydroxy-3,5-di-t-butylphenyl)propane;
2,2-bis-(4-hydroxy-3,5-dicyclohexylphenyl)pentane;
3,3-bis-(4-hydroxy-3,5-dimethoxyphenyl)pentane;
4,4'-dihydroxy-3,3',5,5'-tetrachlorobisphenyl;
2,4'-dihydroxy-3,3',5,5'-tetramethylbenzophenone;
4,4'-dihydroxy-3,3',5,5'-tetraethyl-diphenylsulfone;
2,4'-dihydroxy-3,3',5,5'-tetrapropyldiphenylsulfone;
4,4'-dihydroxy-3,3',5,5'-tetrabutyldiphenylsulfide;
3,4'-dihydroxy-2,3',4,5'-tetrabutoxydiphenylmethane;
4,4'-dihydroxy-3,3',5,5'-tetrabromobenzophenone;
4,4'-dihydroxy-3,3',5,5'-tetramethyldiphenylether;
2,2-bis(4-hydroxy-3,5-dimethylphenyl)propane;
1,1-bis(4-hydroxy-3,5-dibutoxyphenyl)cyclohexane;
1,1-bis(4-hydroxy-3,5-dimethylphenyl)cyclohexane;
bis(4-hydroxy-3,5-dimethylphenyl)sulfone;
4,4'-dihydroxy-3,3'5,5'-tetramethyl diphenyl ether;
2,2'-bis(3,5-dimethyl-4-hydroxyphenyl)-1-chloroethylene;
2,2'-bis(3,5-dimethyl-4-hydroxyphenyl)-1,1-dichloroethylene; and
2,2'-bis(3,5-dibutoxy-4-hydroxyphenyl)-1,1-dibromoethylene, etc.

The difunctional sterically hindered dihydric phenol portion of the block polymers can be conceptualized by the structure of formula (IV) above wherein the hydrogen atoms are disassociated from the hydroxyl groups of the SH-dihydric phenols, and is abbreviated herein by the formula —C—.

The expression "methylene halides" as employed herein and in the claims includes dichloromethane—more commonly known as methylene chloride—dibromomethane, bromochloromethane including mixtures thereof. The coupling agent of the block copolymers can be conceptualized by the —CH$_2$— divalent methylene radical wherein the halogen atoms are disassociated from the methylene halides. These radicals are abbreviated herein by the symbol —Z—.

The "polyformals of sterically-hindered dihydric phenols" (hereinafter also referred to as "SH-aromatic polyformals") are formed "in situ" in accordance with the process described herein. The SH-aromatic polyformal segments associated with the block copolymers may be illustrated by formula (V) set out hereafter:

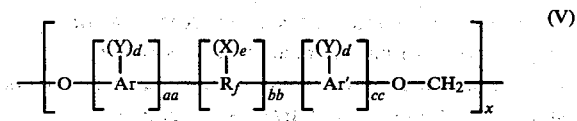

wherein $R_f$, Ar, Ar', Y, d, X, e, aa, bb, and cc are as defined above, and are referred to herein as divalent SH-aromatic polyformal radicals, abbreviated herein by the formula $-(CZ_x)-$ wherein C, Z are as previously defined, and x is a number at least equal to 1.

Presently preferred SH-aromatic-PF units may be illustrated by formulas (VI) and (VII) set out hereafter.

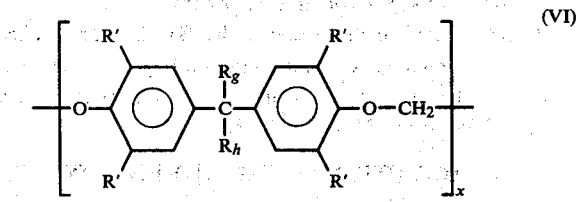

and

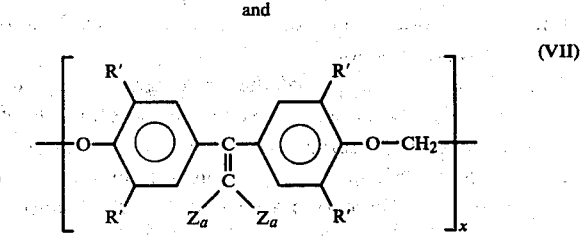

wherein R' is bromine, chlorine, or a $C_{1-4}$ alkyl or alkoxy group, $R_g$ and $R_h$ are hydrogen or a $C_{1-2}$ alkyl group, and $Z_a$ is hydrogen, chlorine or bromine, subject to the proviso that at least one $Z_a$ is chlorine or bromine, and x is as previously defined.

The process of preparing the block copolymers of polyphenylene oxides and sterically-hindered dihydric phenols requires the combination of the reactants in accordance with the following process sequence:

(1) Forming a homogeneous solution of polyphenylene oxide in an inert solvent. The solution preferably contains on a weight/volume (w/v) basis, 10 to 500 grams per liter of polyphenylene oxide to solvent, respectively.

(2) Adding the sterically-hindered bis-phenol monomer to the polyphenylene oxide solution, plus the remaining reactants essential to the process which include methylene halide and base, and, optionally, preferably, a phase transfer agent which ingredients are added substantially currently with the SH-dihydric phenol, (3) Reacting the polyphenylene oxide with the sterically-hindered dihydric phenol monomer, and (4) Recovering the formal-coupled polyphenylene oxide and sterically-hindered dihydric phenol block copolymer.

The solvents that may be employed include solvents which are generally suitable for preparation of homogeneous solutions of polyphenylene oxide and include medium polar solvents such as chlorobenzene, anisole, bromobenzene, ortho-dichlorobenzene, iodobenzene, acetophenone and N-methylformamide, N,N-dimethylformamide, acetonitrile, nitrobenzene, gamma-butyrolactone, nitromethane, dimethylsulfoxide, sulpholane, N-methylpyrrolidone, etc. and mixtures thereof. Preferably the solvents employed are polar aprotic solvents i.e. solvents substantially incapable of forming strong hydrogen bonds with the hydric group associated with the polyphenylene oxide reactant or the sterically-hindered dihydric phenols during the course of the process reactions. Accordingly, any solvent can be employed which is not an antisolvent for the reactants such as polyphenylene oxide or which deleteriously inhibit the reaction via hydrogen bonding associated with the well known protic organic solvents.

In general, the process can be carried out in any strongly basic reaction medium, preferably, that provided by the presence of a strong inorganic base, including mixtures thereof. Representative of basic species which can be employed are alkali metal hydroxides. Specific examples of the aforementioned are lithium, sodium, and potassium hydroxides; etc. Especially preferred bases are substantially anhydrous sodium hydroxide pellets, e.g. electrolytic grade sodium hydroxide pellets containing at least about 98% NaOH by weight.

Optionally, a catalytic phase transfer agent can be employed to enhance the process reaction rate. Preferably, the phase transfer agents are selected from the group consisting of quaternary ammonium, quaternary phosphonium, and tertiary sulfonium compounds or mixtures thereof. These phase transfer agents are well known and include illustratively "onium compounds" described by C. M. Starks in J.A.C.S. 93, 195 (1971), "crown ethers" described in Aldrichimica ACTA 9, Issue #1 (1976) Crown Ether Chemistry-Principles and Applications, G. W. Gokel and H. D. Durst, as well as C. J. Pederson in U.S. Pat. No. 3,622,577 and "chelated cationic salt" which include alkali or alkaline earth metal diamine halides. Specific illustrative examples are described in U.S. Pat. No. 4,201,721 whose descriptions are incorporated herein in their entirety by reference.

Any amount of functionally reactive polyphenylene oxide, sterically-hindered dihydric phenol and methylene halide can be employed, subject to the proviso that the methylene halide is present in stoichiometric amounts at least sufficient to react with the hydroxy groups associated with the polyphenylene oxide and the SH-dihydric phenols and preferably is present in excess of from about 1.25 to as much as 5 to 20 times the stoichiometric amounts required to completely couple all of the reactive polyphenylene oxide and SH-dihydric phenol.

Any amount of base can be employed. Generally effective mole proportions of base relative to the hydroxyl groups associated with the polyphenylene oxide and the SH-dihydric phenols are within the range from about 1:1 to about 50:1, and frequently preferably are from about 1.1:1 to about 3:1.

Any amount of the optional phase transfer agent can be employed, however, generally effective mole proportions of the phase transfer agent relative to the base are within the range of from about 1:10 to about 1:1000 and more frequently preferably are within the range of from about 1:100 to 1:500.

The coupling reactions can be carried out at any temperature. Preferably, temperatures within the range of from about 0° to 150° C. or even higher and more preferably from 50° C. to 100° C. are employed.

The best mode of practicing this invention is set out in Examples hereinafter.

EXAMPLE 1

(A) Preparation of Mono-Functional Polyphenylene Oxide

A 2.5 gallon stainless steel reactor equipped with an air-driven paddle stirrer, oxygen inlet tube, and water-cooled coil and jacket was charged with 2.3 l toluene, 150 g. 2,6-xylenol, 4.2 ml. of a stock catalyst solution, (19.31 g cuprous oxide added slowly with stirring to 100 ml. of a 47.2% aqueous hydrogen bromide (HBr) solution), 3.4 g. N,N'-di(t-butyl)ethylene diamine (DBEDA), 47.5 g. N,N-dimethylbutylamine (DMBA), 1.5 g. di(n-butyl)amine (DBA) and 1.5 g. tricaprylyl-monomethylammonium chloride (Adogen 464). Oxygen was bubbled into the resulting admixture at a rate of 8.3 moles per hour while vigorously agitating the admixture, and 1350 g. of 2,6-xylenol dissolved in 1.5 l of toluene was pumped into the reactor over a 30 minute period. The temperature rose from 25° to 35° C. The polymerization reaction was terminated by replacing the oxygen stream with nitrogen and adding 15 ml. of a 38% aqueous solution of trisodium ethylenediamine tetraacetate (Na$_3$EDTA). The resulting reaction mixture was heated at 50°-55° C. under nitrogen for about one hour and the polymer was precipitated by adding three volumes of methanol. The precipitated polymer was filtered and washed with methanol yielding a white solid polymeric product having an intrinsic viscosity of 0.24 dl./g. measured in chloroform at 25° C. From the infrared absorption at 3610 cm$^{-1}$ an average hydroxyl content of 1.1 —OH groups per polymer chain was calculated. Molecular weight determination by GPC analysis based on a polystyrene calibration furnished the following data:

$\bar{M}w = 17,260$ $\bar{M}n = 8,800$ $\bar{M}w/\bar{M}n = 1.96$

(B) Preparation of Poly-Functional Polyphenylene Oxide

A 500 ml. 3-neck round-bottom flask equipped with condenser, N$_2$ "bubbler" and mechanical stirrer was charged with 50.0 g of mono-functional polyphenylene oxide—prepared as described in (A) above, 1.72 g. TMDQ (tetramethyl diphenoquinone) and 200 ml. of toluene. The mixture was heated under N$_2$ at 65°-70° C. for 3.5 hours. The solution was diluted with 150 ml. of toluene and transferred to a 1 quart Waring blender. With vigorous agitation, the polymer was coagulated by addition of 1 liter of methanol. The light yellow product was twice reslurried in methanol, then collected and dried in vacuo at ~50° C. overnight. The polymer had an intrinsic viscosity of 0.28 dl./g. measured in chloroform at 25° C. From the infrared absorption at 3610 cm$^{-1}$ an average content of 1.8 —OH groups per polymer chain was calculated. Molecular weight determination by GPC analysis based on a polystyrene calibration furnished the following data:

$\overline{Mw} = 23{,}890$ $\overline{Mn} = 8{,}560$ $\overline{Mw}/\overline{Mn} = 2.79$

EXAMPLE 2

(A) Preparation of Block Copolymers of Polyphenylene Oxides and Polyformals of Sterically-Hindered Dihydric Phenols A series of block copolymers was prepared according to the following process sequence:

(1) Forming a solution of polyphenylene oxide, prepared as described in EXAMPLE 1 (A) or (B), in an inert solvent, e.g., chlorobenzene and N-methylpyrrolidone, (2) Adding a sterically-hindered dihydric phenol with methylene halide in the presence of a solvent, e.g. N-methylpyrrolidone, and a base, e.g., sodium hydroxide pellets, (3) Reacting the polyphenylene oxide with the sterically-hindered dihydric phenol monomer, and (4) Recovering a block copolymer of polyphenylene oxide and a sterically-hindered aromatic polyformal.

A detailed procedure with respect to Run No. II, further described in Tables I and II, follows:

A 500 ml. flask equipped with a mechanical stirrer, thermometer and condenser having a nitrogen bubbler attached was flushed with nitrogen and charged with 24.6 g of monofunctional polyphenylene oxide prepared as in EXAMPLE 1 (A) above and 40 ml. of monochlorobenzene. The flask was heated and maintained at about 70° C. in a constant temperature bath. After the polyphenylene oxide had dissolved in the monochlorobenzene solvent, 60 ml. of N-methylpyrrolidone, 30.32 g. of 4,4'-dihydroxy-3,3',5,5'-tetramethyldiphenyl-2,2-propane also known as bis(4-hydroxy-3,5-dimethylphenyl)propane-2,2, i.e., tetramethyl-bis-phenol-A, and 60 ml. of methylene chloride were added. After the tetramethyl-bisphenol-A was dissolved, 11.3 g. of sodium hydroxide pellets (electrolytic grade) was added and the resulting reaction mixture was stirred at reflux reaction conditions of about 65°–70° C. for 5 hours. The resulting block copolymer solution was diluted with 150 ml. of chlorobenzene and transferred to a high speed mixing blender. The block copolymer was coagulated by the addition of 900 ml. of a methanol/acetone mixture—containing equal parts by volume of each, while continuously agitating under high speed mixing conditions. The resulting solid polymer product was collected and reslurried in water to remove residual sodium chloride, washed with acetone, and dried in vacuo at approximately 60° C. 52.5 g. of block copolymer (a yield of approximately 93.4% of theoretical) having an intrinsic viscosity of 0.58 dl/g. measured in chloroform at 25° C. was isolated. By proton nmr analysis the block copolymer was found to contain 45 wt. % polyphenylene oxide.

A sample of the resulting block copolymer was compression molded into a disk 1 mm. thick and 2.5 cm. in diameter at 270° C. at 5000 psi in a laboratory press. The disk was transparent indicating a single phase solid solution.

A resume of the reaction parameters and product properties are set out in Tables I and II, respectively, which correspond to a series of runs carried out in a manner analogous to that described in detail above.

TABLE I

| | REACTION PARAMETERS | | | | | | |
|---|---|---|---|---|---|---|---|
| Run No. | PPO (g) | PPO [η] | TMBPA (g) | NaOH (g) | NMP (ml) | φCl (ml) | CH$_2$Cl$_2$ (ml) |
| I | 8.2 (A) | 0.24 | 30.32 | 11.3 | 60 | 40 | 60 |
| II | 24.6 (A) | 0.24 | 30.32 | 11.3 | 60 | 40 | 60 |
| III | 22.2 (A) | 0.24 | 7.10 | 2.7 | 45 | 30 | 45 |
| IV | 8.2 (A) | 0.11 | 30.32 | 11.3 | 60 | 40 | 60 |
| V | 8.2 (B) | 0.28 | 30.3 | 11.4 | 60 | 40 | 60 |

TABLE II

| | COPOLYMER PROPERTIES | | | |
|---|---|---|---|---|
| Run No. | Yield (g) | [η] | T$_g$ | Wt. % PPO |
| I | 35.2 | 0.61 | 132° C. | 21 |
| II | 52.5 | 0.58 | 138° C. | 45 |
| III | 28.2 | 0.52 | 179° C. | 76 |
| IV | 37.0 | 0.36 | — | — |
| V | 35.4 | 0.82 | — | 23 |

The formal-coupled polyphenylene oxide and sterically hindered dihydric phenols based upon the observed T$_g$ values (T$_g$ value determined employing differential scanning procedure (DSC) techniques in accordance with the teachings set out in J. Chiu, Polymer Characterization by Thermal Methods of Analysis, New York, Marcel Dekker, Inc. (1974)) provide block copolymers having a single phase solid solution, i.e., block copolymers exhibiting complete compatibility in the proportions of polyphenylene oxide and sterically-hindered dihydric phenol polyformal blocks associated with the block polymers of this invention. In general, the block copolymers of this invention, preferably exhibit intrinsic viscosities greater than about 0.30 deciliters per gram, and more preferably greater than 0.45 dl/g. measured in chloroform at 25° C.

The formal-coupled block polymers of this invention can be molded, calendered, or extruded as films, sheets, fibers, laminates or other useful articles of manufacture at temperatures of about 300° F. to about 550° F. employing conventional processing equipment for engineering thermoplastic materials including extruders, e.g. mono and multiple screw types, mills or other mechanical equipment which subject engineering thermoplastic materials to high sheer stress at elevated temperatures. The presence of the sterically hindered dihydric phenol component of the block copolymers enhances the hydrolytic stability of the polymer compositions when contrasted to other engineering thermoplastic materials derived from a non-sterically hindered dihydric phenol such as bisphenol —A.

I claim:

1. A block copolymer of a polyphenylene oxide and a polyformal of a sterically-hindered dihydric phenol.

2. A block copolymer of a polyphenylene oxide and a polyformal of a sterically-hindered dihydric phenol comprising (i) a polyphenylene oxide radical of the formulas:

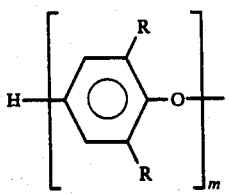

wherein independently each R is hydrogen, a hydrocarbon radical, a halohydrocarbon radical, a hydrocarbonoxy radical or a halohydrocarbonoxy radical, m is a number of at least 1, or

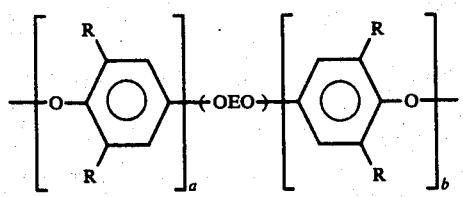

wherein independently the —OEO— is a divalent quinone residue, E is a divalent arene radical, either a or b is at least equal to 1 and the sum of a plus b is at least equal to 10, R is the same as above, (ii) a sterically-hindered aromatic polyformal radical of the formula

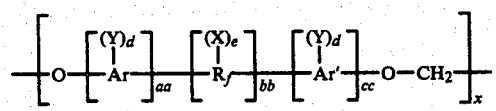

wherein $R_f$ is alkylene, alkylidene including "vinylidene", cycloalkylene, cycloalkylidene or arylene linkage or a mixture thereof, a linkage selected from the group consisting of ether, carbonyl, amine, a sulfur or phosphorous containing linkage, Ar and Ar' are arene radicals, Y is bromine, chlorine or a monovalent alkyl or alkoxy group, d represents a whole number of at least 2 up to a maximum equivalent to the number of replaceable hydrogens substituted on the aromatic rings comprising Ar or Ar'—subject to the proviso that when d is equal to 2 or more, at least 2 Y groups are ortho-positioned relative to each —O— group, X is bromine, chlorine or a monovalent hydrocarbon group selected from the class consisting of alkyl, aryl and cycloalkyl and mixtures thereof, e represents a whole number of from 0 to a maximum controlled by the number of replaceable hydrogens on $R_f$, aa, bb and cc represent whole numbers including 0, when bb is not zero, neither aa or cc may be zero, otherwise either aa or cc but not both may be 0, when bb is zero, the aromatic groups can be joined by a direct carbon bond, x is a number at least equal to 1, and (iii) a methylene radical of the formula —CH$_2$—.

3. The claim 2 polymer wherein the sterically-hindered dihydric phenol radical is of the formula:

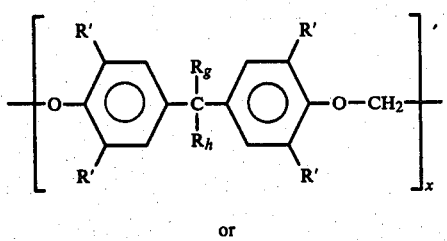

or

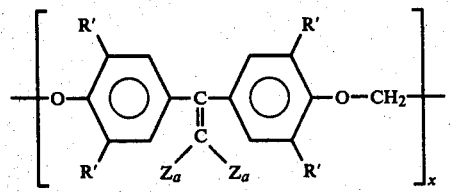

wherein R' is bromine, chlorine, or a C$_{1-4}$ alkyl group, $R_g$ and $R_h$ are hydrogen or a C$_{1-2}$ alkyl or alkoxy group, and $Z_a$ is hydrogen, chlorine or bromine, subject to the proviso that at least one $Z_a$ is chlorine or bromine and x is as previously defined.

4. The claim 3 polymer wherein m is 40 to 170, the sum of a plus b is 40 to 170, and x is 30 to 200.

5. A process of forming block copolymer of a polyphenylene oxide and a polyformal of a sterically-hindered dihydric phenol comprising the following process sequence:

(1) forming a solution of a polyphenylene oxide and an inert solvent, (2) adding a sterically-hindered dihydric phenol methylene halide, a phase transfer agent, and a base to the polyphenylene oxide solvent solution, (3) reacting the polyphenylene oxide with the sterically-hindered dihydric phenol monomer, and (4) recovering the block copolymer of a polyphenylene oxide and a sterically-hindered aromatic polyformal.

* * * * *